F. A. Gleason,
Dovetailing Machine.
N° 12,482.    Patented Mar. 6, 1855.
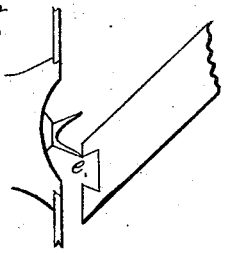
Fig. 8.
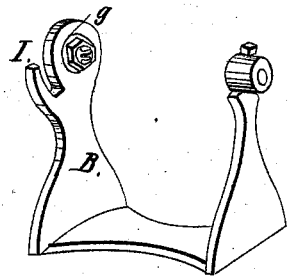
Fig. 6.
Fig. 7.
Fig. 5.
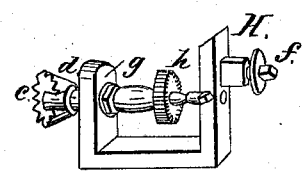
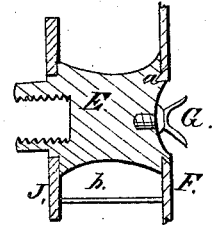
Fig. 2.    Fig. 3.
Fig. 4.
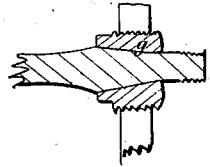
Fig. 1.
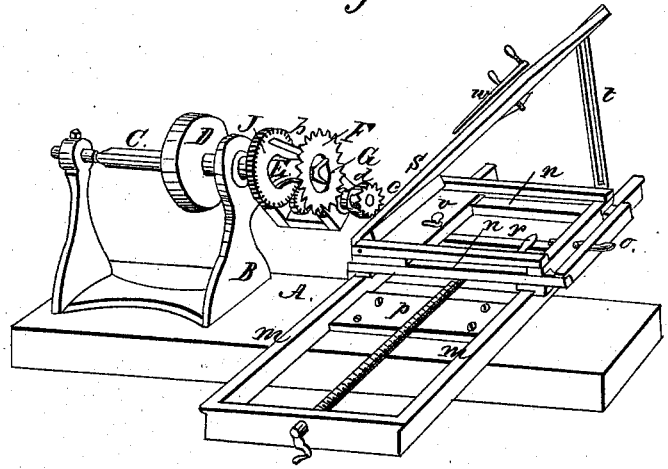

UNITED STATES PATENT OFFICE.

F. A. GLEASON, OF ROME, NEW YORK.

MACHINE FOR CUTTING MITER AND OTHER JOINTS.

Specification of Letters Patent No. 12,482, dated March 6, 1855.

*To all whom it may concern:*

Be it known that I, F. A. GLEASON, of Rome, in the county of Oneida and State of New York, have invented a new and useful Machine for Dovetailing a Miter or other Joint; and I do hereby declare that the following is a full, clear, and exact description of the construction and operation of the same, reference being had to the annexed drawings, making a part of this specification, in which—

Figure 1 is a perspective view; Figs. 2, 3, and 4 are detached sectional views; Figs. 5, 6, and 7 are detached portions of it.

The same letters refer to like parts in each of the figures.

The nature of my invention consists in attaching to the arbor or mandrel of a turning lathe or any similar machine, a chuck, upon which is fixed a circular saw and clearing knife, and in its center a rotary dovetail groover, by which a dovetail groove may be cut longitudinally or otherwise; also in attaching to the headstock a small frame or stock in which runs an arbor carrying a saw and bevel cutter, by which, combined with the groover a dovetail tongue may be formed corresponding with the groove; and in a carriage with an adjustable bed which may be set to any angle required.

In the annexed drawings A, represents the bed; B, the headstock, C, the arbor, and D, the pulley of a common turning lathe.

The construction of my invention is as follows: To the nose of the arbor C, I attach by screw or otherwise the chuck E, upon which I fasten the circular miter saw F, by turning a shoulder angular, or undercut as seen at (*a*) Fig. 2, and then cutting away sections of it as shown Fig. 3. The saw is turned out and cut to correspond with it, then placed on and turned a little backward which fastens it. Between the saw and the toothed wheel J, is fixed the clearing knife (*b*). In the center of the chuck is fixed by screw the dovetail groover G, an enlarged and detached view of which is seen Fig. 7. It is formed with two cutting blades opposite to each other, on the ends of which are flanges or lips for cutting off the chip.

Fig. 5 represents the tonguing stock which is attached to the headstock B, by the shank H being placed in the stirrup I, Fig. 6, and fastened by the set screw (*f*). Upon its arbor is fastened the tonguing saw (*c*) and the bevel cutter (*d*) which is constructed with a collar which fits upon the arbor, the opposite ends being notched into the saw.

(*h*) is a toothed wheel, gearing into the wheel J, Fig. 1, by which it is driven, Fig. 4.

(*g*) is a sectional view of the boxes in which the arbors run. They are screwed into the frame instead of being notched in and fastened by cap and screws. By this method the arbors may be carried back or forward, and so adjusted as to cut in line with each other. The inner end is squared for a wrench as seen at Figs. 5 and 6. The arbor is made conical and the box bored to correspond with it that it may be tightened as it wears away.

In the construction of the carriage (*m m*) are the ways upon which it runs (*n n*) are the cross ways upon which the bed is carried to or from the saws by the adjusting screw (*o*).

(*p*) is the feeding screw (which may be geared to the arbor or turned by hand,) (*r*) the handle attached to a cam which disconnects the feeding screw from the carriage, (*s*) the bed, (*t*) its support, fastened to it by a set screw in the slot by which it may be set to any angle required.

(*v*) is a set screw to fasten the carriage when adjusted.

(*w*) is the clamp for fastening the work.

The operation is as follows: I take off the tonguing stock, bring the carriage forward, and by the adjusting screw (*o*) move the bed so near the miter saw that the dovetail groover shall cut through the center or any desired portion of the work. The machine is then set running, and by turning the feeding screw, the work is carried past the saw F, which cuts the miter; the clearing knife cuts away the part running back of the saw which would otherwise run against the chuck; and the groover cuts a dovetail groove or channel through. I then place the carriage opposite the saw and by the adjusting screw (*o*) bring the bed so far back that the piece just grooved laid loosely upon it shall drop down to the position shown at (*e*) Fig. 8, which determines the position of the tongue. I then place the tonguing stock in the stirrup, place the work upon the bed and feed as before. The miter saw cuts the end of the tongue; the groover cuts the upper side, and the tonguing saw and bevel cutter cut the under side.

Having thus described my invention, what I claim and desire to secure by Letters Patent is—

1. The rotary dovetail groover as described, or its equivalent.

2. I claim the miter saw F with the clearing knife (*b*) fixed upon the same chuck and concentric with the groover; also the manner of fastening the saws as described.

3. I claim the tonguing stock with its saw and bevel cutter or their equivalents; also the manner of attaching it to the headstock.

4. I claim the carriage with its movable bed which may be adjusted to any angle required.

F. A. GLEASON.

Witnesses:
JOHN H. HUNTINGTON,
GEORGE BARNARD.